· US005949427A

United States Patent [19]
Nishikawa et al.

[11] Patent Number: 5,949,427
[45] Date of Patent: *Sep. 7, 1999

[54] COLOR IMAGE PROCESSING APPARATUS AND METHOD AND COLOR IMAGE OUTPUT APPARATUS EACH USING A COLOR MATCHING/PROCESSING METHOD BASED ON THE COLOR IMPUT

[75] Inventors: Naoyuki Nishikawa; Nobuyuki Nakajima, both of Yokohama, Japan

[73] Assignee: Canon Kabushiki Kaisha, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/662,281

[22] Filed: Jun. 12, 1996

Related U.S. Application Data

[63] Continuation of application No. 08/177,143, Jan. 4, 1994, abandoned.

[30] Foreign Application Priority Data

| Jan. 7, 1993 | [JP] | Japan | 5-000963 |
| Oct. 1, 1993 | [JP] | Japan | 5-246877 |

[51] Int. Cl.⁶ ............................................... G06T 11/40
[52] U.S. Cl. ................................. 345/431; 345/522
[58] Field of Search .................... 355/131, 119, 355/118; 358/518–520; 345/431–2, 418–9, 150–154

[56] References Cited

U.S. PATENT DOCUMENTS

| 4,992,861 | 2/1991 | D'Errico | 358/75 |
| 5,042,078 | 8/1991 | Oshikoshi et al. | 382/54 |
| 5,268,753 | 12/1993 | Yamaguchi | 358/527 |
| 5,282,046 | 1/1994 | Yamaguchi | 358/296 |
| 5,311,295 | 5/1994 | Tallman et al. | 348/180 |
| 5,313,291 | 5/1994 | Appel et al. | 358/501 |
| 5,323,249 | 6/1994 | Liang | 358/518 |
| 5,367,387 | 11/1994 | Yamaguchi | 358/518 |
| 5,420,694 | 5/1995 | Matsumoto | 358/462 |
| 5,528,261 | 6/1996 | Holt et al. | 345/15 |

FOREIGN PATENT DOCUMENTS

| 0321983 | 6/1989 | European Pat. Off. . |
| 0475734 | 3/1992 | European Pat. Off. . |
| 0518619 | 12/1992 | European Pat. Off. . |

OTHER PUBLICATIONS

McMillan, Thomas M., "The promise of portable Color: calibration tools and device–independent management systems should spark an explosion in Color publishing", *Computer Graphics World*, v15, n9, p. 30(8), Sep., 1992.

(List continued on next page.)

Primary Examiner—Mark K. Zimmerman
Attorney, Agent, or Firm—Fitzpatrick, Cella, Harper & Scinto

[57] ABSTRACT

A multicolor printer which can print an image with improved image quality by selecting a desired color reproduction process depending on data to be handled. An output apparatus comprises an input unit 111 for receiving visual data containing data in a command format for output control; image data etc. delivered from an external apparatus; an analyzer 112 for analyzing the input data; a developing unit 113 for developing the input data into output data based on an analyzed result; a color processor 114 for executing color processing such as color space compression on the input data during the development by the developing unit; a color processing method storage 116 for storing a plurality of color processing methods executed by the color processor 114; and a selector 115 for selecting one of the plural color processing methods in the storage 116. When developing the input data by the developing unit 113 into the output data, desired one of the plural color processing methods is selectively used in the output apparatus depending on the input visual data. Thus, optimum color reproduction depending on any of plural types of input data attributes is enabled without increasing load on a host computer.

23 Claims, 15 Drawing Sheets

OTHER PUBLICATIONS

Ford, Ric; Guglielmo, Connie, "Apple's new technology and publishing strategies", *MacWeek,* v6, n34, p. 38(4), Sep. 28, 1992.

ColorSync®™ Utilities, Inside Macintosh, Developers Note, Developer Technical Publications, Jul. 15, 1993.

Fraser, Bruce, "ColorSync framework helps solidify Color management", *MacWeek,* v7, n6, p. 32(3), Feb. 8, 1993.

DiNucci, Darcy, "Monitor calibrators: a piece of Color–management puzzle, (systems for transferring the Colors shown on monitors to print)", *MacWeek,* v6, n38, p. 32(2), Oct. 26, 1992.

"The challenge of Color imaging", *Seybold Report on Desktop Publishing,* v7, n3, p. 19(7),Nov. 2, 1992.

Dyson, Peter E., EFI's Cachet: Color expert in a box, *Seybold Report on Desktop Publishing,* v7, n2, p. 3(10), Oct. 1, 1992.

Guay, Randall G., "Method of Color correction that preserves perceived Color Differences", Corporate Source: Apple Computer Inc., Santa Clara, Ca, USA Conference Title: Color Hard Copy and Graphic Arts Conference Location: San Jose, CA, USA Conference Date: Feb. 11–14,1992 Sponsor: SPIE—Int Soc for Opt Engineering, Bellingham, WA USA E.I. Conference No.: 17244.

Egol, Len, "Good Color and price, soon", *Direct,* v4, n11, p. 30(1), Nov., 1992.

Dyson, Peter; Eliezer, Caren, "Agfa rolls out FotoFlow: open approach to color management", *Seybold Report on Publishing Systems,* v22, n8, p. 3(6), Jan. 14, 1993.

Rothenberg, Matthew, "Color–matching apps hook up with ColorSync", MacWeek, v7, n1, p. 1(2), Jan. 4, 1993.

Schroeder, et al, "Color management struts its stuff; Apple's ColorSync garners major support", *PC Week,* v10, n2, p. 35(2), Jan. 18, 1993.

Quinlan, Tom, "Color matching next on Apple hit list: Apple's ColorSync technology to help users match output to display", *InfoWorld,* v15, n2, p. 24(1), Jan. 11, 1993.

Fraser, Bruce, "Getting Color in sync", *MacUser,* v9, n3, p. 165(7), Mar., 1993.

Product Announcement, "Apple Reveals color architecture; open approach puts color matching in system software", *Seybold Report on Desktop Publishing,* v6, n7, p. 34(2), Mar. 9, 1992.

Roth, Steve, "Managing Color", *MacWorld,* pp. 148–151, Jan., 1993.

Roth, Steve, "All About Color", *MacWorld,* pp. 140–145, Jan., 1992.

Stone, et al, "Color Gamut Mapping and the Printing of Digital Color Images", *ACM Transactions on Graphics,* v7, n4, pp. 249–292, Oct., 1988.

"Gamut Mapping Computer Generated Imagery", M.C. Stone et al., Graphics Interface '91, 1991, pp. 32–39.

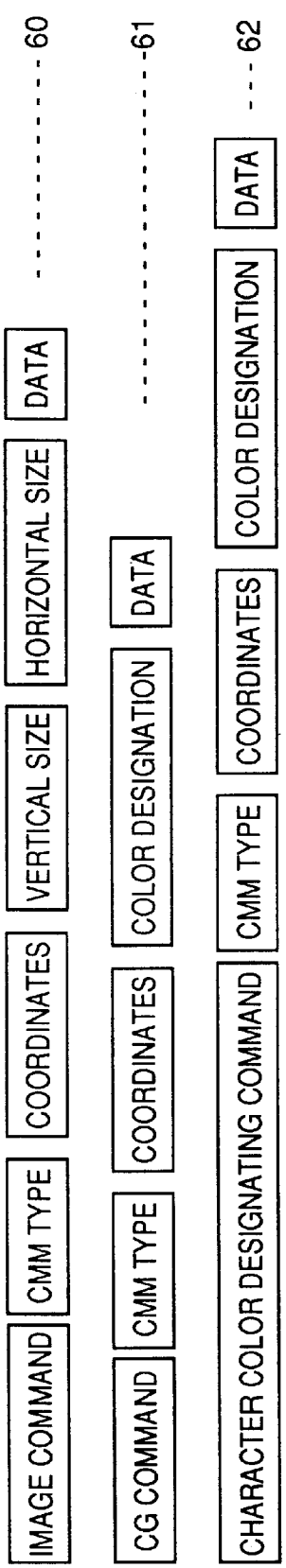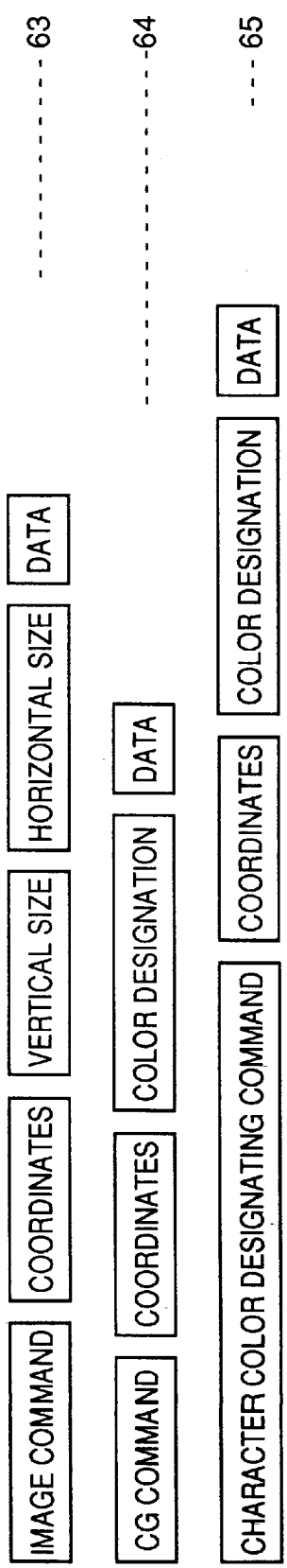

COLOR IMAGE PROCESSING APPARATUS AND METHOD AND COLOR IMAGE OUTPUT APPARATUS EACH USING A COLOR MATCHING/PROCESSING METHOD BASED ON THE COLOR IMPUT

This application is a continuation of application Ser. No. 08/177,143 filed Jan. 4, 1994, now abandoned.

BACKGROUND OF THE INVENTION

1. Field of the Invention

The present invention relates to a color image processing apparatus and method, and a color image output apparatus, and more particularly to an apparatus and a method capable of presenting good color reproducibility.

2. Description of the Related Art (Relating to Color Space)

In output apparatuses such as color printers for printing figures and image data, color data to be handled are designated by RGB values, which are in turn designated by color modes or commands, for figure data, and are provided in the RGB point or frame sequential format for image data. Other than the RGB color space, YMC color spaces (such as depending on ink characteristics) specific to respective printers and XYZ color spaces or the like defined by CIE, etc. are also handled in some cases. In any case, actual printing is performed by making input data subjected in a printer to a color reproduction process (e.g., conversion from RGB to YMCK) corresponding to a color space defined for the printer when printed.

Generally, in consideration of color matching between color data handled by a color printer and a different apparatus (e.g., a color scanner or a color display such as CRT), it is often practiced to define one color space as a reference and perform color compensation suited to light emitting (coloring) characteristics for each color processing apparatus. In this case, color processing in the color printer is also executed to be compatible with the color space as a reference so that the color printer can output and reproduce an image displayed by a color display, for example, with good fidelity.

In a system shown in FIG. 1, if various apparatuses are each configured to be able to precisely perform color space conversion and color compensation, it is possible for those apparatuses to handle standardized colors. In an example of FIG. 1, for enabling a color scanner 11, a color display 13 and a color printer 15 to handle the same color data, one color space is defined as a reference and the color data are converted into color spaces specific to the apparatuses by associated color space converters 12, 14, 16. With such a configuration, the apparatuses can handle standardized colors.

In practice, however, the apparatuses have different ranges of color reproduction due to their intrinsic physical characteristics. Although it is difficult to pursuit for a calorimetric matching, color compensation for minimizing a color difference by the use of color difference formula represented by CIE 1976 L*a*b*, for example, is generally practiced in view of the above. Therefore, color printers are also designed to perform color space conversion and color compensation therein so as to print colors as possible as close to those on the color space as a reference when handling color data.

FIG. 2 is a block diagram showing typical data processing executed in a color printer, particularly showing a conversion process from input RGB data into YMC. As shown, data input through a receiving buffer 21 are supplied to a data analyzer 22 which analyzes a data type from the data format. In the case of image data, the data are branched to an image developing system 23, converted into YMC data by referring to a color reproduction processor 24, and then applied to a page buffer 26. In the case of computer graphics (CG) data, the data are branched to a CG developing system 25, converted into YMC data by referring to the color reproduction processor 24, and then applied to the page buffer 26 likewise.

While many color difference formulae have been proposed for methods of evaluating whether two colors represented on different media are identical to each other or not, any method has not yet been absolutely established and various methods are employed case by case depending on the purposes of use at the present. Similarly, there are several methods for color reproduction which are also employed case by case depending on the purposes of use. Taking into account color matching, the evaluating method is necessarily different depending on which color reproduction is aimed. In color printers, a color reproducing method executed therein is an important element directly affecting image quality of prints. Generally, as mentioned above, the color difference formula of CIE 1976 L*a *b* or the like is practiced so that color compensation is performed to minimize color differences. This method is effective when color data read by a scanner are reproduced by a color printer, because the original is a reflecting document (i.e., colors represented on paper) and reproducing those colors with ink used in the printer is relatively easy. In other words, as physical coloring mechanisms are basically the same, color reproduction is easier than the case of other media although there are problems of a difference in ink characteristics and ink density (gradation).

However, since colors produced by luminescence on screens of color displays are different in their physical characteristics per se from colors on a reflecting document, there are limitations in pursuing color reproduction by the use of general color difference formulae. When an image produced by such a display media is a natural picture, a method of color reproduction generally called preferred matching is often employed. This method is based on the concept of achieving good color reproduction for some important colors (e.g., color of the human skin) in an image, apart from whether a reproduced image and an original image have identical colors or not. Such color reproduction is effective in handling data such as a natural image, but a color reproduction process taking no consideration of identity of colors raises a drawback when handling data such as a CG image.

The above problem can be solved if a color reproduction process can be changed in accordance with data to be processed. In conventional color printers, however, the color processing referred in an internal developing process to produce a final output is fixed regardless of data to be handled, as shown in FIG. 2. Color printers are usually designed with a mind to achieve identity of colors. Accordingly, when data to be processed is a natural image, it was impossible to execute a different color reproduction process such as preferred matching.

The above-mentioned problems can also be thought below from another aspect.

Generally, in output apparatuses for forming an image based on color visual data input thereto, a difference in color reproduction range between the input side and the output apparatus is caused as a problem during a process of color reproduction. A CRT monitor or the like is a luminescent device in which light source colors RGB are mixed in an additive manner to carry out color reproduction. On the other hand, a printer or the like is a device in which ink colors YMCK are mixed in a subtractive manner to carry out color reproduction. Such a difference in the color reproducing manners results in different color reproduction ranges between the monitor and the printer and, usually, the monitor has a larger color reproduction range.

FIG. 8A shows how the color reproduction ranges are different from each other. Denoted by 80 in FIG. 8A is a color space which is theoretically conceivable in accordance with standards such as NTSC using an L*a* b* uniform color space, i.e., a color space which input data from a host computer can take. 81 is a color reproduction range of a monitor and 82 is a color reproduction range of a printer.

When an input color image is produced by an output apparatus, those colors which are outside a color reproduction range of the output apparatus are required to be made correspond to suitable colors in the color reproduction range. This is generally called color space compression. A conventional output apparatus incorporates only one kind of method for the color space compression or no methods, and the color space compression is performed on the host computer side.

There have generally been practiced several methods for the color space compression. These methods will now be described with reference to FIGS. 8A to 8D on an assumption that the color reproduction range of a monitor is converted into the color reproduction range of a printer.

In FIG. 8A, 83, 84 indicate the brightest colors (white points) in the respective color reproduction ranges of the monitor and the printer, whereas 85, 86 indicate the darkest colors (black points).

The first compressing method is performed by, as shown by a dot line in FIG. 8B, mapping the white and black points of the monitor to the white and black points of the printer, respectively, and then converting other colors while keeping the relative relationship to the white and black points. Thus, the conversion is made so that a figure indicated by the dot line is similar to the color reproduction range 81. This method is suitable for processing image data such as a photograph including many colors.

The second compressing method is performed by, as shown in FIG. 8C, mapping colors of the monitor to an outer edge of the color reproduction range of the printer without changing L* (luminosity). This method is suited to reproduce colors with high fidelity as desired for logo marks or the like (i.e., spot colors).

The third compressing method performs the compression by sacrificing luminosity to some extent without changing saturation as possible as practicable, as shown in FIG. 8C. This method is suitable for CG or the like.

Thus, since optimum methods for color space compression are different depending on the types of input data such as image data, spot colors and CG, it is desired to selectively employ any one of the compressing methods in conformity with the purpose.

As mentioned before, however, a conventional output apparatus incorporates, at best, only one kind of method for the color space compression, and cannot realize selective use of the above compressing methods depending on the types of input data. This leads to a difficulty in carrying out optimum color reproduction.

Further, an attempt of designing a host computer to select any one of the color space compressing methods and execute a compression process would result in a drawback of increasing a burden imposed on the host computer to execute the compression process and degrading performance of the entire system.

SUMMARY OF THE INVENTION

An object of the present invention is to solve all or some of the drawbacks mentioned above.

Another object of the present invention is to provide a color image processing apparatus, a color image processing method and a color image output apparatus, which can satisfactorily reproduce a natural image or the like.

Still another object of the present invention is to provide a color image processing apparatus, a color image processing method and a color image output apparatus, which enables precise color reproduction for an CG image or the like.

To achieve the above objects, according to a preferred embodiment of the present invention, there is disclosed an apparatus comprising input means for receiving visual data from an external apparatus, analyzing means for analyzing the input data received by the input means, data developing means for developing the input data into output data in accordance with a result analyzed by the analyzing means, and including color processing means which executes color processing on the input data, storage means for storing a plurality of color processing methods to be executed by the color processing means in the data developing means, select means for selecting one of the plural color processing methods stored in the storage means, and output means for outputting the data having been developed by the developing means to be adapted for output.

Yet another object of the present invention is to provide a color image processing apparatus which is suitably built in apparatus having a printing function.

Further objects, features and advantages of the present invention will be apparent from the following detailed description of embodiments of the present invention with reference to the accompanying drawings.

BRIEF DESCRIPTION OF THE DRAWINGS

FIGS. 14A and 14B are diagrams showing one example of an input command string in the third embodiment.

DETAILED DESCRIPTION OF THE PREFERRED EMBODIMENTS

[First Embodiment]

A first embodiment of the present invention will hereinafter be described in detail with reference to the attached drawings.

The following description is made in connection with an embodiment in which the invention is applied to a color reproduction process executed inside a color printer.

<Outline of color printer>

Figure 1:
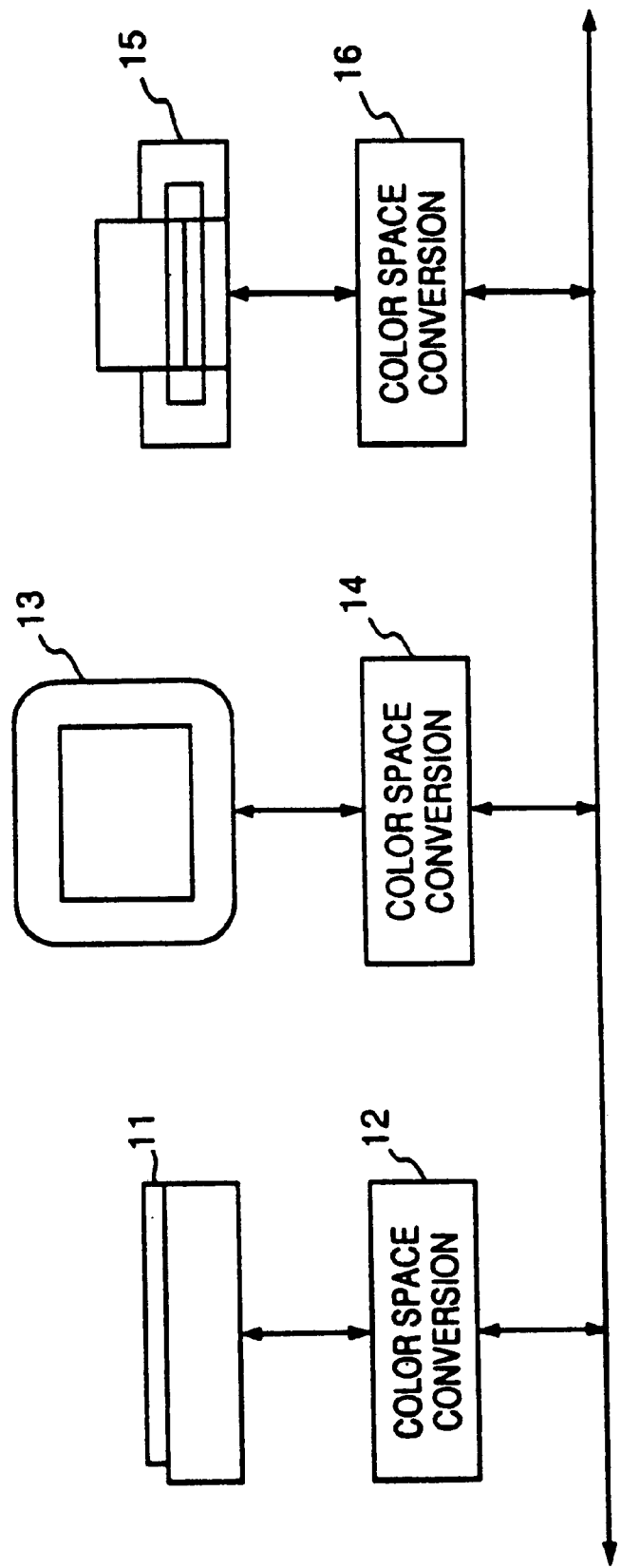
FIG. 1 is a block diagram showing the configuration of a system for carrying out space color conversion for each of apparatuses.
Figure 2:
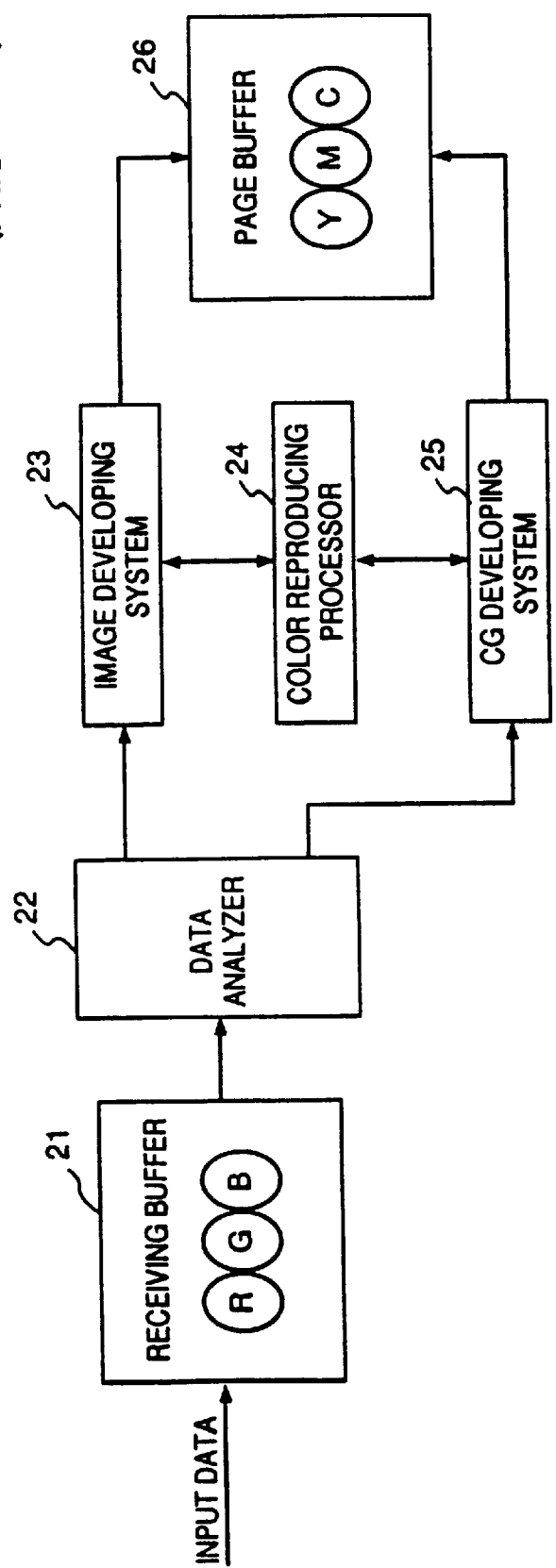
FIG. 2 is a block diagram showing a typical process of color space conversion in a color printer.
Figure 3:
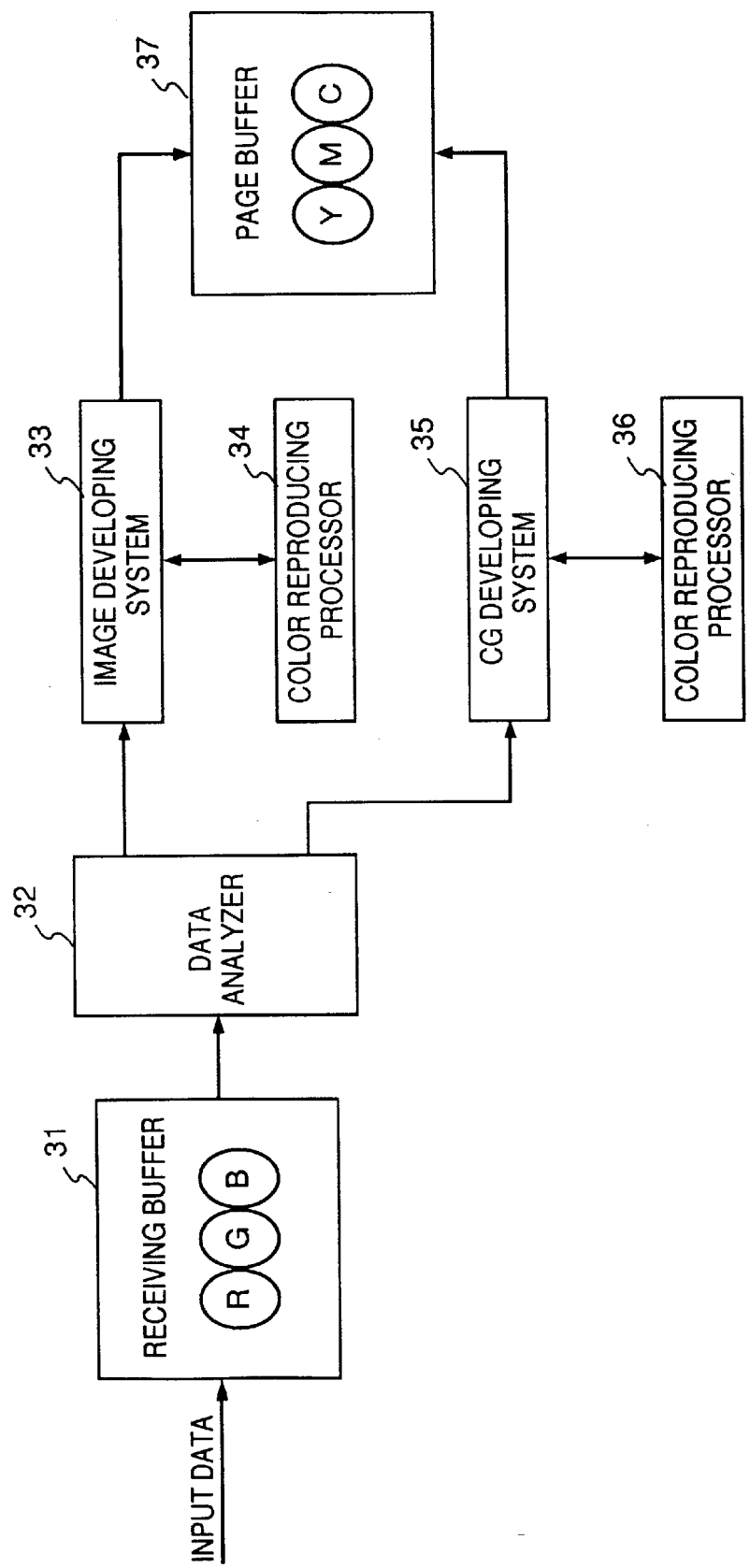
FIG. 3 is a block diagram showing a process of color space conversion in a color printer according to one embodiment of the present invention.

FIG. 3 is a block diagram showing a main internal process concerned with color processing executed in a color printer according to this embodiment. As shown, input data are first temporarily recorded in a receiving buffer 31 and then supplied to a data analyzer 32 which analyzes a data type from the data format. When the input data are image data, a pixel size and RGB values for each pixel are arrayed in a point sequential format. When the input data are CG data, data indicating a figure type and coordinate values of the figure, RGB data as color designating values, etc. are arrayed in a format compatible with the associated processing system. After analyzing whether the input data are image data or CG data by the data analyzer 32, the process is branched to a developing system corresponding to the data type. More specifically, when processing image data, the data are branched to an image developing system 33 from the data analyzer 32, converted into YMC data by referring to a color reproduction processor 34, and then applied to a page buffer 37. When processing CG data, the data are branched to a CG developing system 35 from the data analyzer 32, converted into YMC data by referring to a color reproduction processor 36, and then applied to the page buffer 37.

<Outline of color reproduction process>

The difference between the color reproduction processors 34 and 36 will be described below. The color reproduction processor 34 is to execute a color reproduction process with much care paid to identity of colors, and is designed to output a color image sample, read the output color sample, make both a color of the read sample and a color to be output from the system 33 subjected to colormetry, and minimize a difference between both results of the colormetry, i.e., a color difference, over an entire color space. On the other hand, the color reproduction processor 36 is designed to execute a color reproduction process with care paid to preferred matching, such that an important color in a natural image or the like (e.g., skin color) develops satisfactorily.

Note that the term "preferred matching" used herein includes, rather than the above color matching made over an entire color space, any other color matching such as made to provide satisfactory coloring of a particular color, for example. This example will be described later with reference to FIGS. 8A to 8D.

<Outline of preferred matching>

For the color reproduction processor 34, it is designed to minimize a color difference between each pair of the sampled color and the color to be output over a color space as a whole and, therefore, its purpose is clear. A description will now be given on the specific purpose of the preferred matching carried out in the color reproduction processor 36.

As a result of the inventor studying color spectrum distribution in a natural image, it has been found that most data belong to an intermediate gradation zone, and those data which are distributed near very low and very high gradation zones are little. Also, if a natural image includes the latter data, such an image is no more than an unnatural image in many cases. Therefore, it is thought to execute the process in which importance is attached to color reproduction near the intermediate gradation zone, while sacrificing the data near the low and high gradation zones. This method is effective particularly in the case of handling, for example, a binary image of which gradation representing ability is not so high, and also presents a merit of improving gradation by using the zone which provides color reproduction as good as possible.

Figure 4:
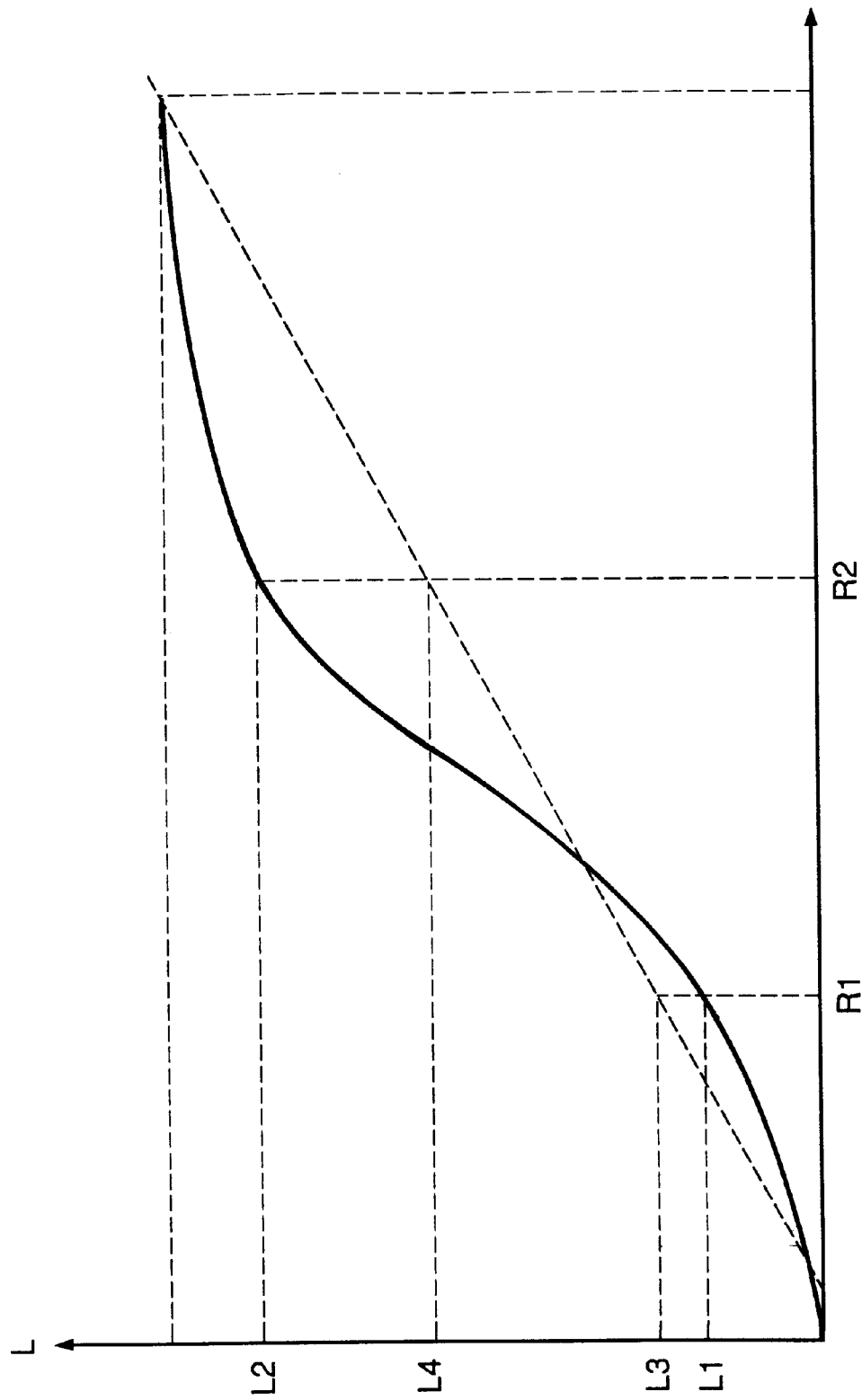
FIG. 4 is a graph indicating a characteristic of gradation.
Figure 5:
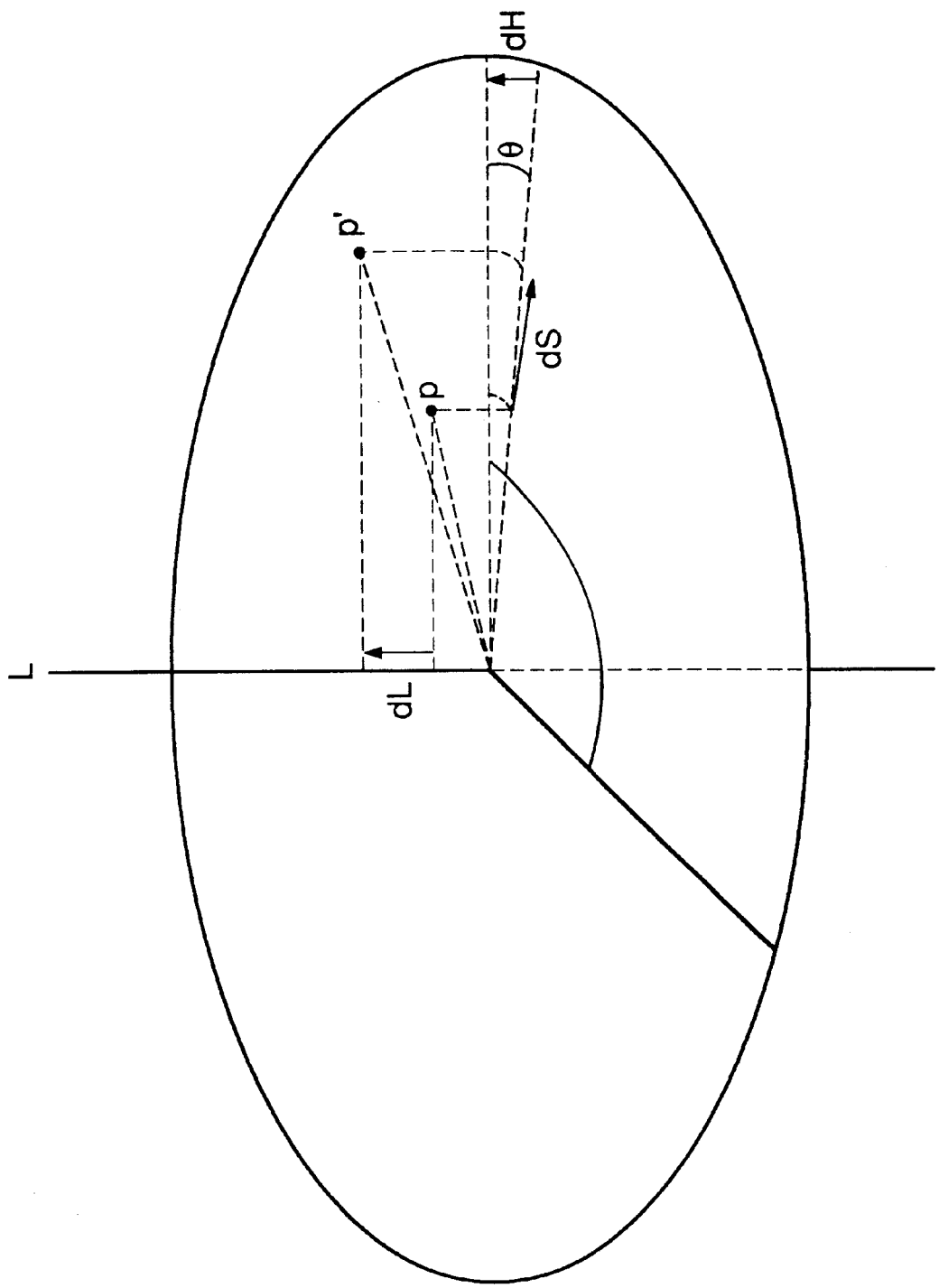
FIG. 5 is a graph indicating a color shift based on an HLS color representation system.

As seen from an example shown in FIG. 4, the curve indicated by a solid line has a larger slope than the straight line indicated by a dot line in the intermediate gradation zone defined by R1 and R2, meaning that image gradation can be reproduced satisfactorily. Executing the above process inevitably causes a color shift as shown in FIG. 5. FIG. 5 shows movement of a point p to a point p' on an HLS color representation system (polar coordinate system in which L indicates a vertical axis, H an angle from the reference line, and S a distance from the origin). The shift amount is expressed by three variables of dH, dL and dS shown in the drawing. While identity of colors is not necessarily required to be considered and some color shift is allowed in the case of preferred matching, there also would arise a problem if the color shift occurs in a large amount. Therefore, the color reproduction process is designed here to keep a value of delta E in the color difference formula of CIE 1976 $L^*a^*b^*$ within "20".

Figure 6:
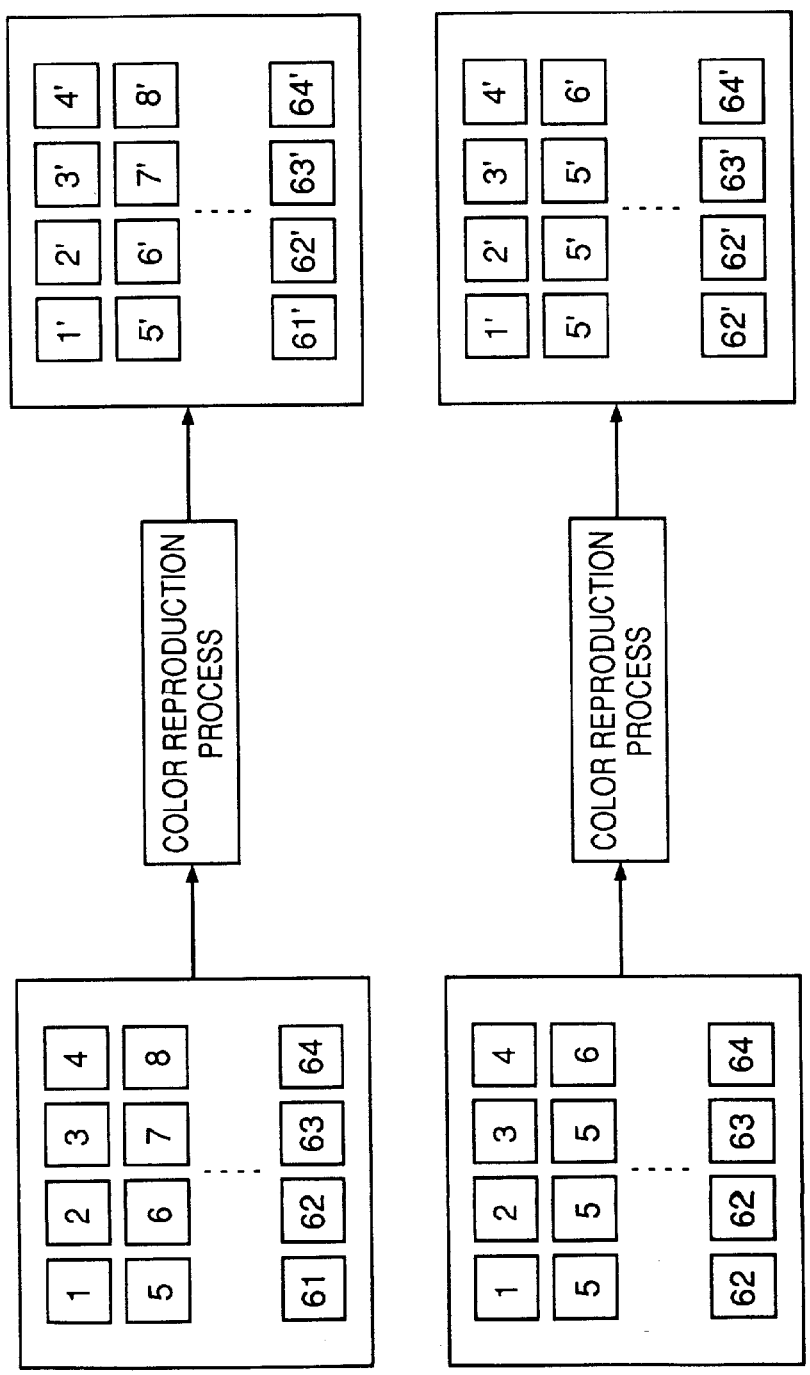
FIG. 6 is a diagram showing a weighting step in a color reproduction process.

Further, as to color patch data prepared in determining masking parameter, several colors which regarded to be important for a natural image, such as a skin color, are also operated to have better characteristics in the color reproduction process by increasing values of weighting for those colors. As shown in FIG. 6, the weighting values are increased by employing usual color patches which are dividing a color space uniformly.

Figure 7:
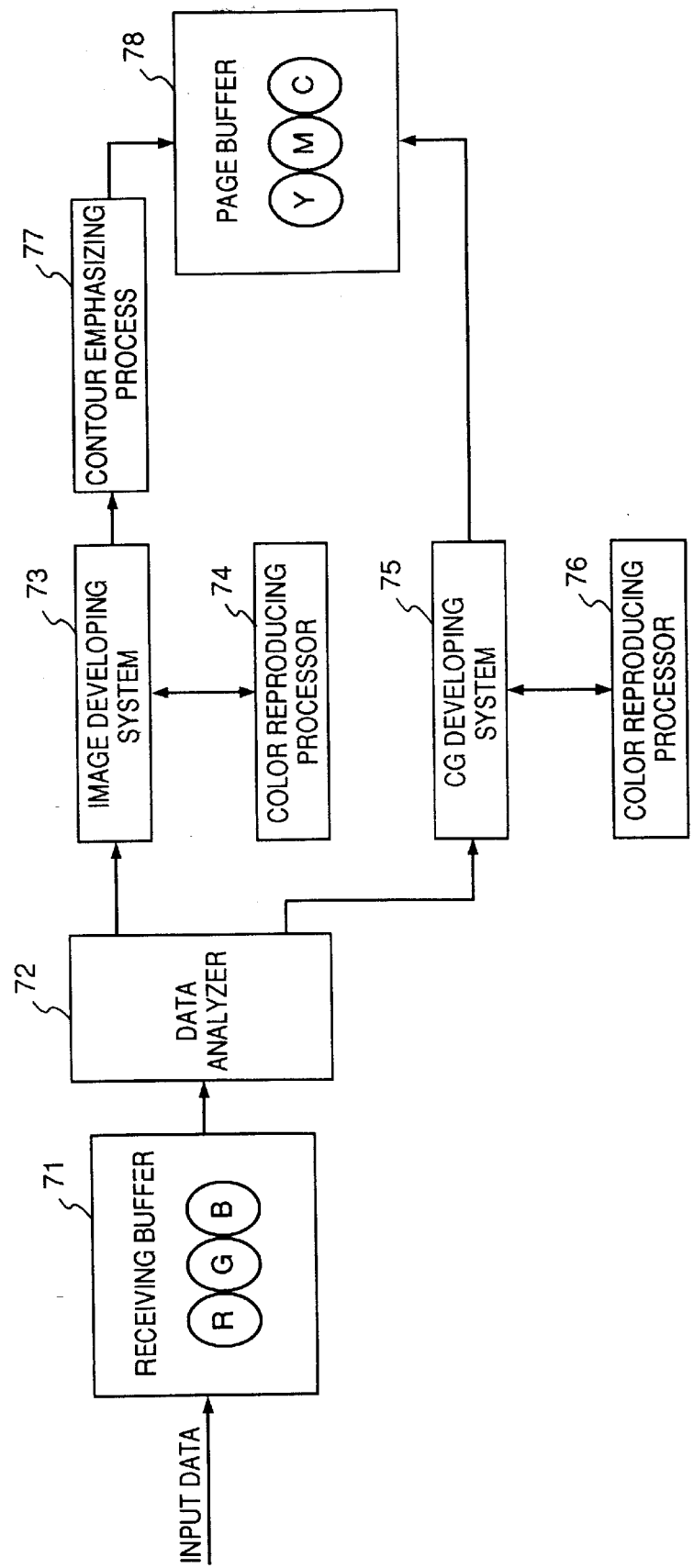
FIG. 7 is a block diagram of a color printer according to a modified embodiment.
Figure 8A:
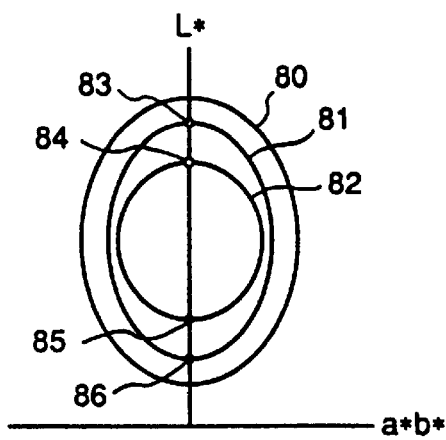
FIGS. 8A to 8D are conceptual diagrams for explaining color reproduction ranges and color space compression.
Figure 8B:
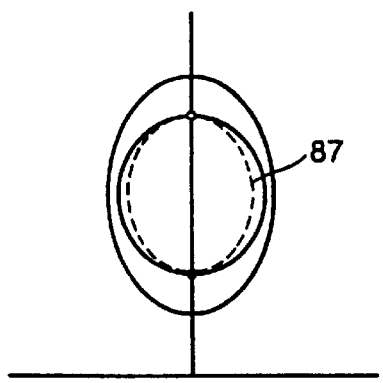
Figure 8C:
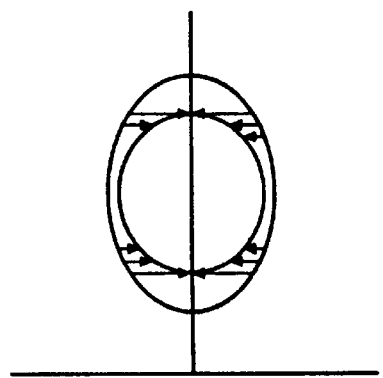
Figure 8D:
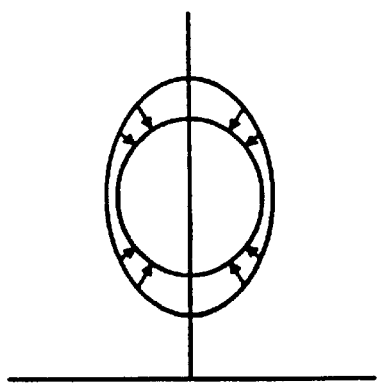

FIG. 7 shows a modified embodiment in which a contour emphasizing process is additionally executed in the processing of image data.

Input data are first temporarily recorded in a receiving buffer 71 and then supplied to a data analyzer 72 which analyzes a data type from the data format. When the input data are image data, a pixel size and RGB values for each pixel are arrayed in a point sequential format. When the input data are CG data, data indicating a figure type and coordinate values of the figure, RGB data as color designating values, etc. are arrayed in a format compatible with the associated processing system. After analyzing whether the input data are image data or CG data by the data analyzer 72, the process is branched to a developing system corresponding to the data type. More specifically, when processing image data, the data are branched to an image developing system 73 from the data analyzer 72, converted into YMC data by referring to a color reproduction processor 74, and then applied to a page buffer 78 through a contour emphasizing process 77. When processing CG data, the data are branched to a CG developing system 75 from the data analyzer 72, converted into YMC data by referring to a color reproduction processor 76, and then applied to the page buffer 78. The process executed by each color reproduction processor is the same as that in the above embodiment and hence will not be described here.

In the contour emphasizing process 77, an image is scanned in each of horizontal and vertical directions to extract, as its contour, those portions where pixel values are abruptly changed, and then modify the pixel values so that their change rate are increased, thereby providing sharper image quality to clearly represent the contour portions. Note that the contour emphasizing process itself is well known and hence its detailed description is omitted here.

Thus, with this embodiment, since an optimum color reproduction process corresponding to each data type is automatically selected in a color printer, improved image quality can be obtained in printing of a natural image and, at the same time, no drawbacks are caused in color reproduction of a CG image or the like, even when a standardized color space is used for data of various images.

This embodiment may be applied to a system comprising a plurality of units or an apparatus comprising one unit. It is needless to say that this embodiment is also applicable to the case where the intended processing is achieved by loading a program into the system or apparatus.

According to this embodiment, as described above, by selecting a color reproduction process corresponding to data to be handled, the data can be printed with more satisfactory image quality.

[Second Embodiment]

A second embodiment of the present invention will hereinafter be described in detail with reference to the attached drawings.

The following description is made in connection with a color printer of bubble-jet (BJ) type, but it is a matter of course that the invention can also similarly applicable to any other output apparatuses such as color printers of other types and color monitors.

In this embodiment, an output apparatus comprises an input unit for receiving visual data containing data in a command format for output control, image data and so on which are delivered from an external apparatus, an analyzer for analyzing the input data received by the input unit, developing unit for developing the input data into output data in accordance with a result analyzed by the analyzing unit, color processor constituting a part of the developing unit and executing color processing such as color space compression on the input data during the development made by the developing unit, storage for storing a plurality of color processing methods, and selector for selecting one of the plural color processing methods stored in the storage. When the input data received from the external apparatus are developed by the developing unit into the output data, one of the plural color processing methods stored in the storage is selected by the selector in accordance with the analyzed result of the input data by the analyzer, and the color processing unit executes the color processing in accordance with the selected color processing method. With such an arrangement, color space compressing methods can selectively be used in the output apparatus depending on the input visual data, which enables optimum color reproduction without increasing a load imposed on a host computer.

The second embodiment will be described below in more detail.

Figure 9:
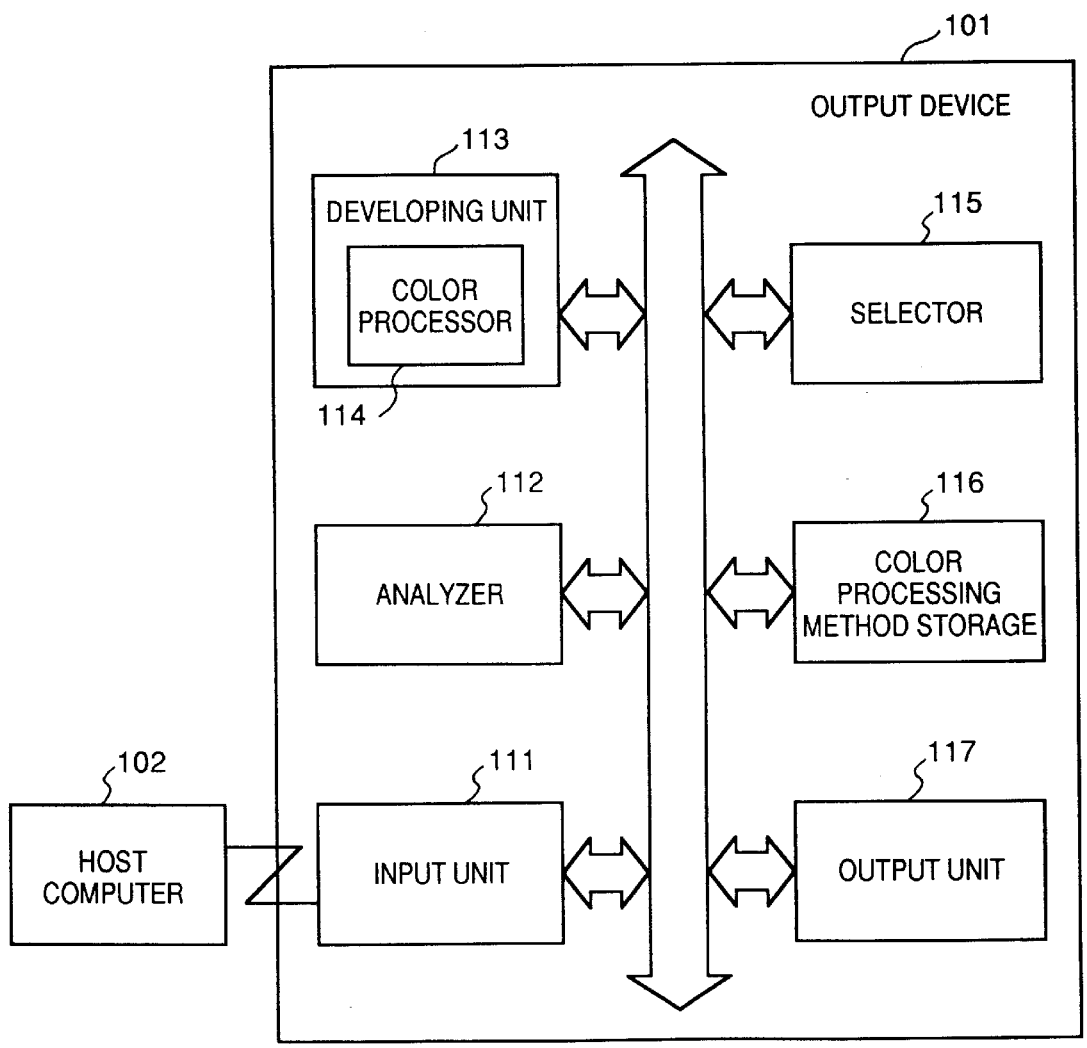
FIG. 9 is a block diagram showing one example of a control circuit for use in an output apparatus according to a second embodiment of the present invention.

FIG. 9 is a block diagram showing one example of a control circuit constituting a part of an output apparatus according to the second embodiment of the present invention. In FIG. 9, denoted by 101 is an output apparatus of this embodiment and 102 is an external apparatus such as a host computer or terminal apparatus.

In the output apparatus 101, denoted by 111 is an input unit which receives data transferred from the host computer 102. 112 is an analyzer which analyzes the input data received by the input unit 111 and forms data in an intermediate format to be used in a laterdescribed developing unit 113. The intermediate format data will be described later.

Denoted by 113 is a developing unit which executes various processes based on the intermediate format data prepared by the analyzer 112 for conversion into output data to be used by a later described output unit. 114 is a color processor which is incorporated in the developing unit 113 to especially execute color processing. The term "color processing" means, for example, a process of finally converting input data in RGB representation from a monitor into data in CMYK representation which constitute color signals to be output from a printer, and includes a process of color space compression executed to compensate for the difference in color reproduction range between the monitor and the printer which difference is produced during the conversion, as explained before.

Denoted by 115 is a selector which selects and takes, from a later-described color processing method storage, one of the color processing methods for use in the color processing by the color processor 114. 116 is a color processing method storage which stores a plurality of color processing methods to be used by the color processor 114 for the color processing. 117 is an output unit which forms an output image by using the output data from the developing unit 113. The output data used in the output unit are data in a bit map format for one page and prepared respectively for CMYK four colors. The output unit 117 delivers the output data to a BJ head for printing an image on print paper by using ink in colors of C (cyan), M (magenta), Y (yellow) and K (black).

Figure 10:
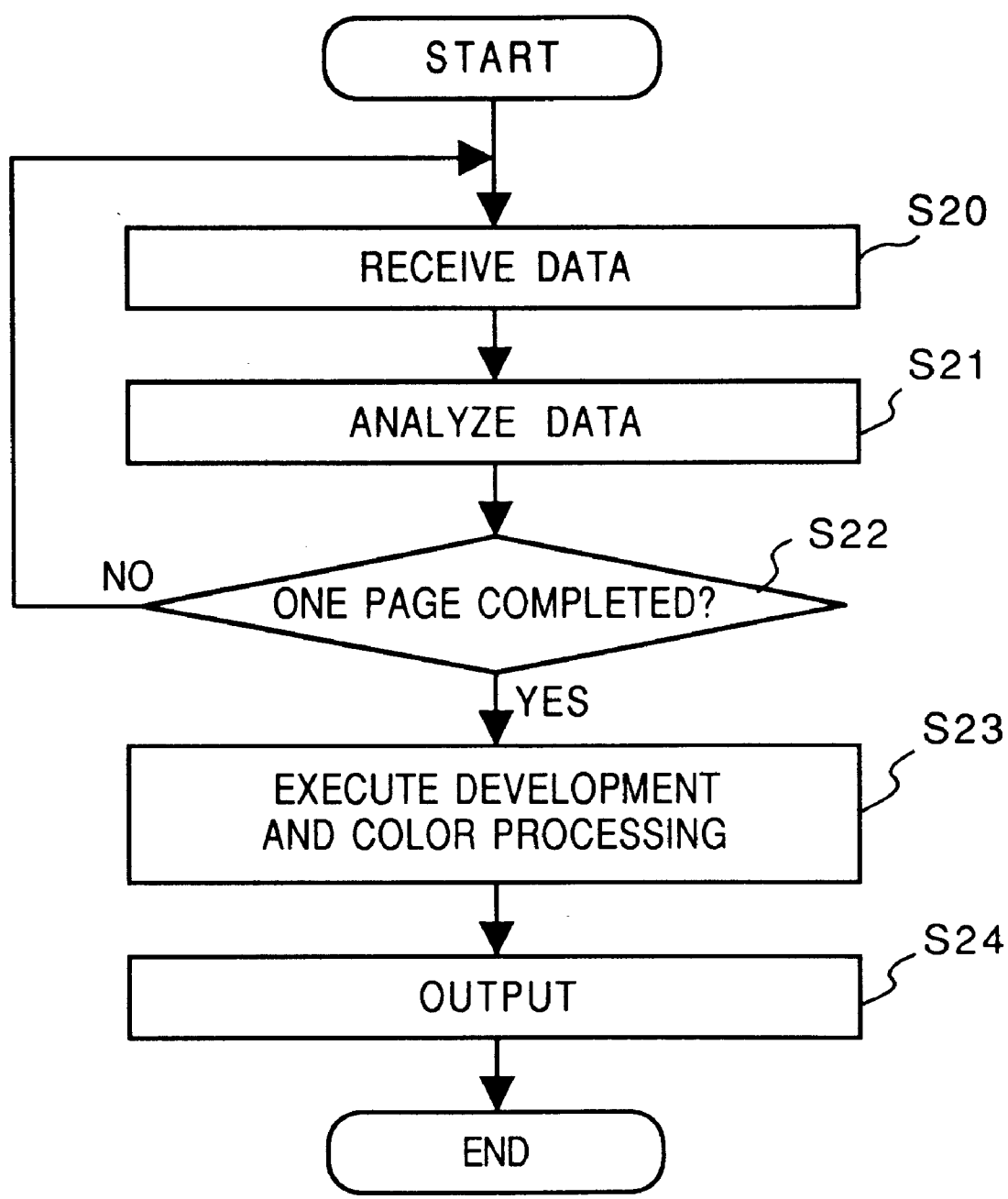
FIG. 10 is a flowchart showing an output process for one page in the second embodiment.

A description will now be given on processing steps in the control circuit of this embodiment arranged as explained above, with reference to flowcharts shown in FIGS. 10 and 11. FIG. 10 shows processing steps executed by the output apparatus 101 when it receives data for one page from the host computer 102 and forms output data.

Figure 13:
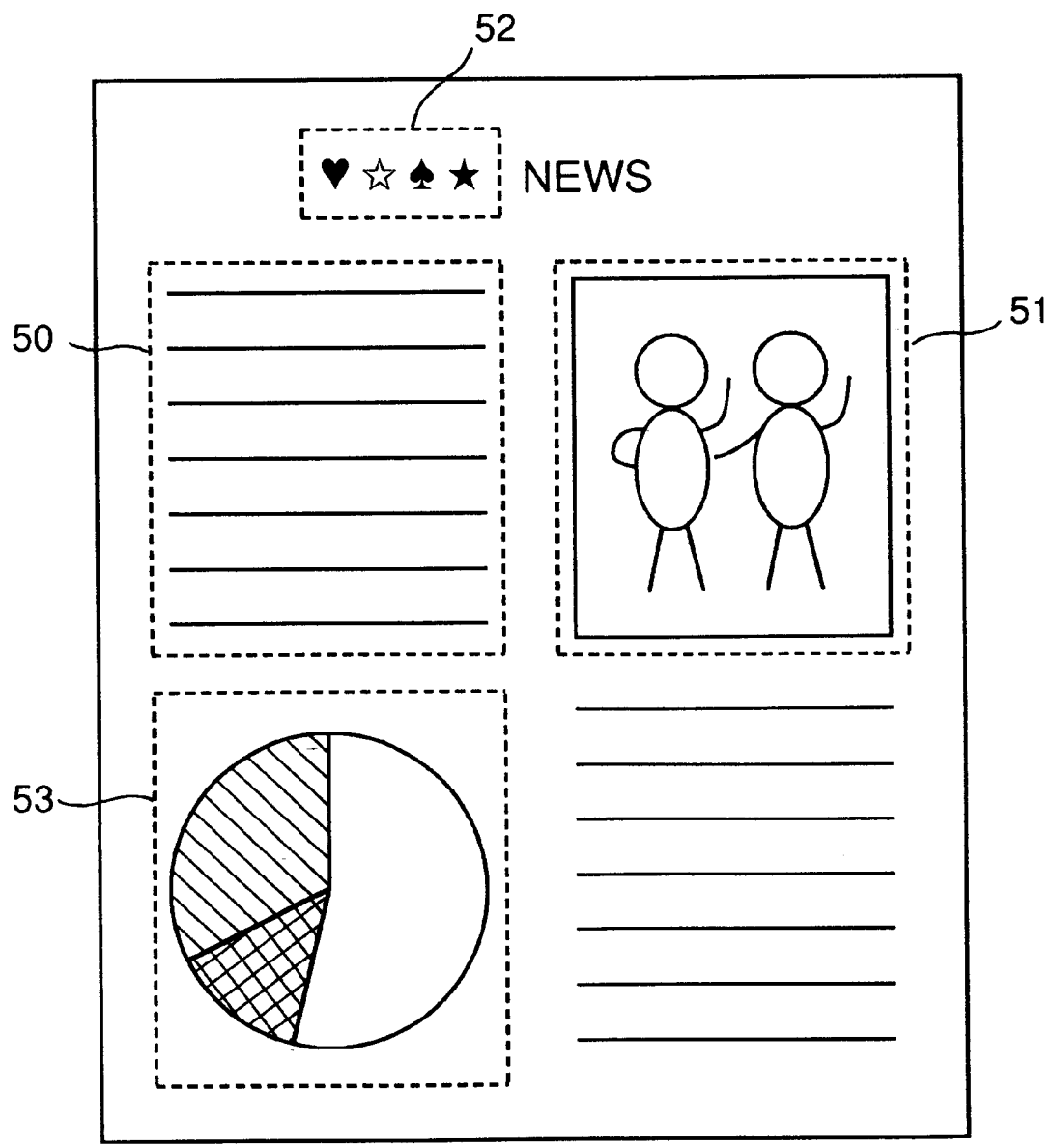
FIG. 13 is a diagram showing one example of an image to be processed in the third embodiment.

First, in step S20, the input unit 11 receives data for one page from the host computer 102. An exemplary image of one page to be output through the processing is shown in FIG. 13. Referring to FIG. 13, denoted by 50 a text portion comprised of character strings, 51 is a portion of full-color image data resulted from scanning a photograph, 52 is a portion comprising registered characters such as logo marks which are colored in accordance with the registered numbers, i.e., the designated spot colors, and 53 is a portion of CG data such as a pi chart selectively colored.

More specifically, the host computer 102 converts an image on a monitor, including various forms as shown in FIG. 13, into input visual data adapted to be produced from the output unit 101 and then delivers the converted data. In this case, the input data include various commands and data necessary for forming output data, such as commands for designating a character code and a type of character font, commands for the full-color image data and data themselves, commands for CG inclusive of color designation, and commands for the spot colors.

FIGS. 14A and 14B show one example of those commands. In FIG. 14A, denoted by 60 is one example of commands for the image data. Here, "image command" at the head one byte indicates the type of each command, next "CMM (color matching method)" is a byte for designating a color processing or matching method (hereinafter referred to as CMM) used to process this command string, and "coordinate" is plural bytes for designating positions in a page where the image is to be drawn. After that, other necessary byte strings follow and, at the last, the image data are transferred.

Similarly, 61, 62 denote examples of CG commands and character color designating commands, respectively. In these commands, a byte of "color designation" may be described in RGB representation or given by the registered number designating any spot color. As with the above example 60, the CMM type can be designated for each of the command strings. Accordingly, the optimum CMM can be designated depending on each command string.

As explained before with reference to FIGS. 8A to 8D, by way of example, the color space compressing method (hereinafter referred to as CMM1) represented in FIG. 8B is suitable for image data, the method (hereinafter referred to as CMM2) represented in FIG. 8C is suitable for spot colors, and the method (hereinafter referred to as CMM3) represented in FIG. 8D is suitable for CG.

Figure 15:
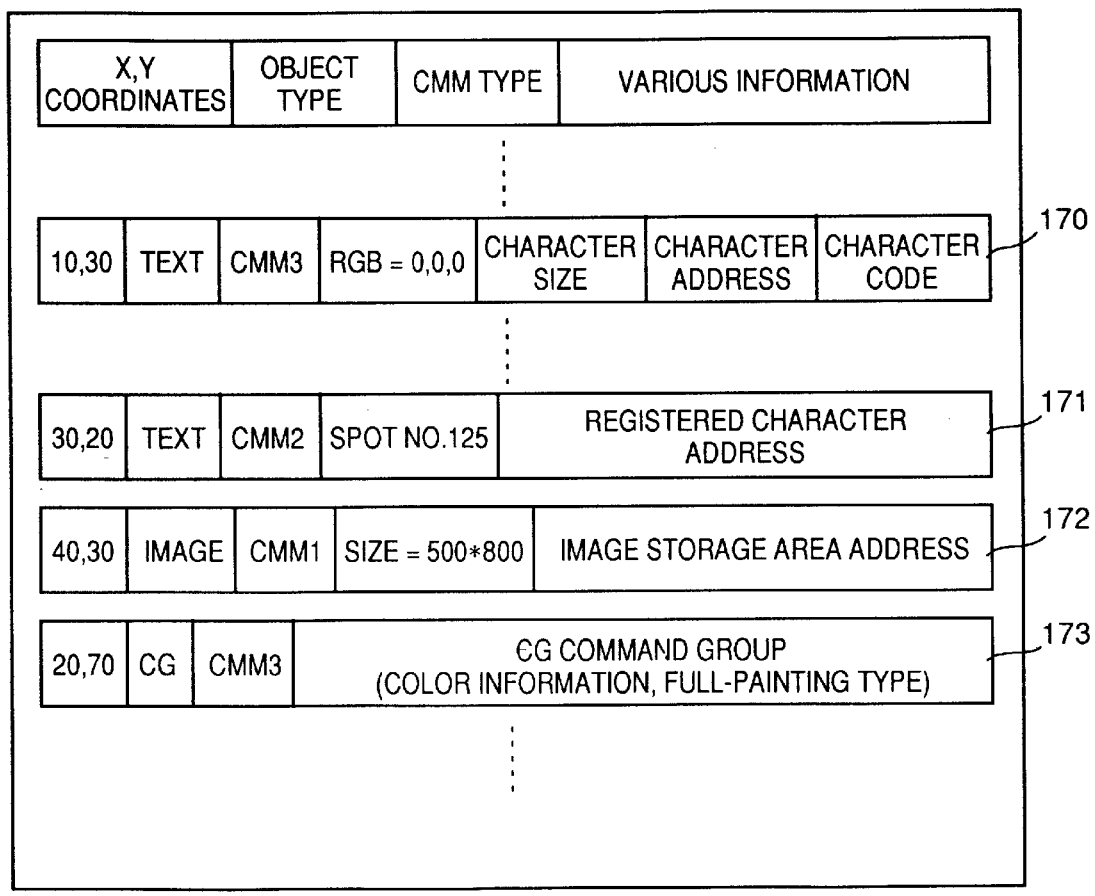
FIG. 15 is a diagram showing one example of data in an intermediate format in the third embodiment.

Subsequently, the analyzer 112 analyzes the input data and forms data in an intermediate format on a page-by-page basis. FIG. 15 shows one example of the intermediate format data. The intermediate format data become a base from which the developing unit 113 forms the output data in a bit map format, and are arrayed into a record for each of the above command strings. In FIG. 15, 170 to 173 denote examples of records showing the text for characters, the text for spot colors, the image data, and the CG data, respectively.

Depending on the record type, entries making up each record comprises information which usually includes, as seen from FIG. 15, XY-coordinates in a page, object type, CMM type, designated color, data size, character code, character type, address pointer for a data storage area, etc.

Then, it is determined in step S22 whether the input data for one page has completely been analyzed or not by the analyzer 112. This determination is usually made based on whether a page updating command "FF" has been received or not. If the input data for one page has not yet been analyzed, then the process returns to step S20 for continuously receiving and analyzing the data to form the intermediate format data.

If it is determined in step S22 that the input data for one page has completely been analyzed, then the process goes to step S23 for development and color processing. This step is executed by the developing unit 113 and the color processor 114 based on the intermediate format data. More specifically, the developing unit 113 develops the records shown in FIG. 15 one by one over a bit map memory. For the image data record 172, by way of example, the image data are read in accordance with the image storage address pointer and applied onto a bit map to spread over a size of (500×800) with XY-coordinates (40, 30) on the bit map locating at an upper left corner of the image. For each of all other records, the contained data are similarly developed over a bit map memory.

In step S23, the color processor 114 executes the color processing for each object based on the CMM type and the color information contained in the corresponding record. A process flow to be followed by the color processor 14 at this time is shown in FIG. 11.

Figure 11:
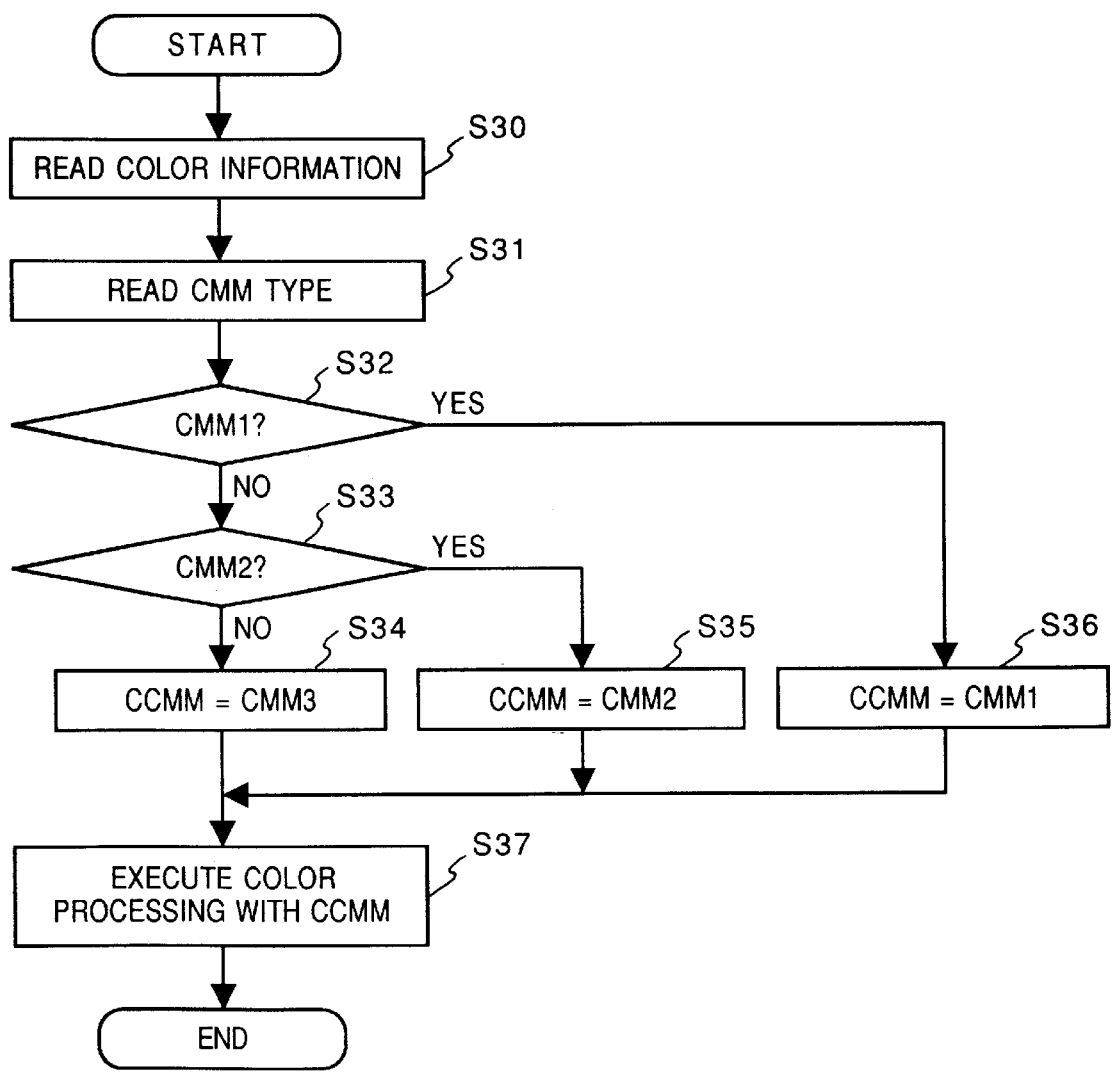
FIG. 11 is a flowchart showing color processing in the second embodiment.

Referring to FIG. 11, color information in the record to be processed is first read in step S30. The color information in this case is given by RGB representation or the registered number designating any spot color. Then, CMM type information in the record is read in step S31. After that, the selector 115 selects one current CMM in accordance with the CMM type information.

More specifically, it is first determined in step S32 whether the CMM type information indicates CMM1 or not. If so, then the current CMM is set to CMM1 in step S36. Likewise, determination as to CMM2 and setting to CMM2 are performed in steps S33 and S35, respectively. If the determinations in steps S32 and S33 are both NO, then the current CMM is set to CMM3 in step S34. CMM1 to CMM3 are stored in the color processing method storage 116 and selectively set as the current CMM on request.

In next step S37, the color processing is executed by using the current CMM. In the color processing, the input data, i.e., input values in RGB representation or the registered numbers designating spot colors, are converted by the color processor 114 into data in CMYK representation which constitute color signals to be output from the printer. The color processing also includes a process of color space compression executed to prevent color crush in high saturation zones caused by the difference in color reproduction range between the monitor and the printer which difference is produced during the conversion, as explained before.

Depending on the selected CMM, the color processing in the color processor 114 can be practiced by, for example, a table look-up method of preparing a table for color conversion beforehand and referring to the table in accordance with an input value to obtain an output value, or a method of conducting arithmetic operation using a conversion formula, such as matrix operation, on input values to calculate output values.

The developing unit 113 forms data to be stored four bit map memories for CMYK based on the output values resulted from the color processor 114 in accordance with the designated CMM. In other words, the color processor 114 serves as the so-called black box in the developing unit 113 so that it produces optimum output values depending on the input values and the designated CMM.

The process of step S23 is ended at the completion of forming of the four bit map data for CMYK. The prepared data are then output in step S24 as follows. The bit map data prepared in step S23 are converted by the output unit 117 into the form adapted for printing by a BJ head. The term "form" used herein depends on a configuration of the BJ head. In the case of the BJ head comprising vertical 64 nozzles, for example, the four bit map data for CMYK are each divided into blocks in units of 64 rasters from above.

Following the data conversion, the output unit 117 feeds a sheet of print paper, transmits one of the data blocks for CMYK to the BJ head, and further drives the BJ head for printing an image on the sheet of print paper. Then, the output unit 117 advances the sheet through a distance corresponding to the head height (64 dots in this case). After repeating such a series of operations (i.e., for transmitting the data block, driving the BJ head, and advancing the sheet) for one page, the output unit 117 discharges the printed sheet, thereby ending the printing of one page.

With this embodiment, as described above, since desired one of color space compressing methods can selectively be used in the output apparatus depending on input data of an image, optimum color reproduction is enabled without increasing load imposed on the host computer.

[Third Embodiment]

A third embodiment on the basis of the above second embodiment will be described below. While the CMM type is designated by one of commands from the host computer in the above second embodiment, this third embodiment is arranged so as to automatically select optimum CMM in the output apparatus based on the object designation contained in the commands. This enables the designation of CMM type to be omitted from the command string, as shown in FIG. 14B.

This third embodiment is of the same construction as the above second embodiment, but different in control therefrom. A description will now be given on those parts which are different from the above second embodiment.

Figure 12:
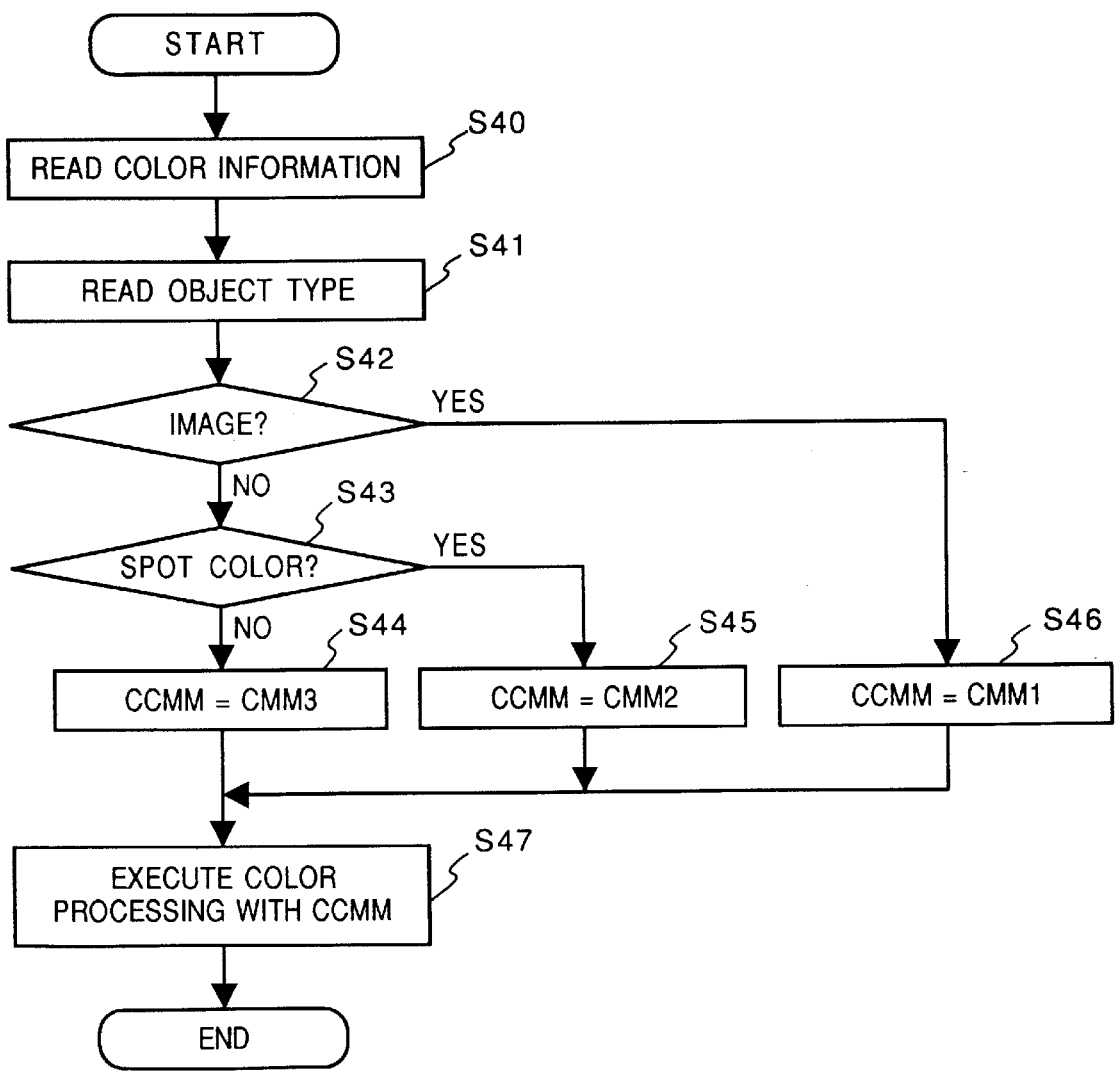
FIG. 12 is a flowchart showing color processing in a third embodiment according to the present invention.

FIG. 12 shows a flow of color processing in the third embodiment. Referring to FIG. 12, color information in the record to be processed is first read in step S40 similarly to the second embodiment. As mentioned above, the color information in this case is given by RGB representation or the registered number designating any spot color or pallet color.

Then, object type information in the record is read in step S41. The record used in this embodiment includes no entry of CMM type information. In accordance with the object type information, the selector 15 selects a current CMM. More specifically, it is first determined in step S42 whether the object type information indicates image data or not. If so, then the current CMM is set in step S46 to CMM1 which is a color space compressing method most suitable for image data. It is then determined in step S43 whether the color information designates a spot color or not and, if so, the current CMM is set to CMM2 in step S45. If the determinations in steps S42 and S43 are both NO, then the current CMM is set to CMM3 in step S44.

In next step S47, the color processing is executed by using the current CMM as with the second embodiment. The remaining parts of the process are the same as those in the second embodiment.

With the third embodiment, as described above, since optimum CMM is automatically select in the output apparatus based on the object designation contained in commands from the host computer, it is possible to omit the designation of CMM type from a command string, in addition to the above-mentioned advantage of the second embodiment.

These second and third embodiments may also be applied to a system comprising a plurality of units or an apparatus comprising one unit.

It is needless to say that these second and third embodiments are also applicable to the case where the intended processing is achieved by loading a program into the system or apparatus.

According to these second and third embodiments, as described above, since desired one of color space compressing methods can selectively be used in an output apparatus depending on input data of an image, optimum color reproduction is enabled without increasing a burden imposed on a host computer, thereby producing an ideal output.

Consequently, the present invention illustrated in the foregoing embodiments provides color processing means which is very advantageously built in a printer receiving color visual data from a host computer or a printer driver for a host computer.

Color matching methods applicable to the present invention are not limited to the examples shown in FIG. 8, but may be replaced by any other suitable methods.

Furthermore, the color image output apparatus of the present invention may be a printer or a monitor. It is essential that input data are reproduced as a color visible image.

As many apparently widely different embodiments of the present invention can be made without departing from the spirit and scope thereof, it is to be understood that the invention is not limited to the specific embodiments thereof except as defined in the appended claims.

What is claimed is:

1. A color image processing method comprising the steps of:

receiving a drawing command of a color object, having coordinate data and color data;

discriminating an image type of said color object based on the drawing command;

selecting a color matching method corresponding to said image type; and performing, based on the coordinate data and color data, a developing process including a color matching process using the selected color matching method.

2. A color image processing method according to claim 1, further comprising the step of:

executing a color matching process in accordance with the color matching method selected by said select means.

3. A color image processing method according to claim 1, wherein said color matching process includes a color gamut mapping, in which the received color data is mapped in a color gamut of an output device.

4. A color image processing method according to claim 1, wherein the color matching process includes a color gamut mapping method in which a mapping is performed so as not to change saturation of said received color data as much as possible when the image is a graphic image.

5. A color image processing method according to claim 1, wherein a plurality of color objects are disposed on a single page.

6. The method according to claim 1, wherein said drawing command is expressed by a page description language.

7. A color image processing apparatus comprising:

reception means for receiving a drawing command of a color object, having coordinate data and color data;

discriminating means for discriminating an image type of said color object, based on the drawing command;

selecting means for selecting a color matching method corresponding to said image type; and developing means for performing, based on the coordinate data and color data, a developing process including a color matching process using the selected color matching method.

8. A color image processing apparatus according to claim 7, wherein said color matching process performs a color matching between a monitor and image forming apparatus.

9. A color image processing apparatus according to claim 7, wherein said image type includes a graphic image and a natural image, and wherein color image data corresponding to said graphic image are comprised of data indicating a figure type, coordinate values of the figure and color designating values.

10. A color image processing apparatus according to claim 9, wherein plural image types of a color object include a graphic image and a natural image.

11. A color image processing apparatus according to claim 9, wherein the selecting means selects the color matching method which performs a preferred matching to the natural image.

12. A color image processing apparatus according to claim 7, wherein plural color objects are combined for forming an output image, and wherein said discriminating means discriminates an image type for each color object.

13. A color image processing apparatus according to claim 7, further comprising:

a printer unit for forming a color image on the basis of the color image data in which said color matching processing is performed.

14. A color image processing apparatus according to claim 7, wherein said color matching processing means performs a color gamut mapping processing based on a color gamut of an output device.

15. The apparatus according to claim 7, wherein said drawing command is expressed by a page description language.

16. A color image processing apparatus comprising:

input means for inputting a drawing command having coordinate data and color data;

discriminating means for discriminating an image type of said drawing command;

color matching processing means for performing a color matching process for said color data by using a color matching method corresponding to the discriminated image type; and developing means for, based on the coordinate data and color data, performing a developing process using the color matching method, wherein said color matching processing means performs color matching between different devices.

17. A color image processing apparatus according to claim 16, wherein said color matching processing performs a color gamut mapping on the basis of a color gamut of an output device.

18. A color image processing apparatus according to claim 16, further comprising:

a printer unit for forming a color image on the basis of the color image data in which said color matching processing is performed.

19. A color image processing apparatus according to claim 16, wherein said different devices are a monitor and an image forming apparatus.

20. A color image processing apparatus according to claim 16, wherein plural image types of a color object included a graphic image and a natural image.

21. The apparatus according to claim 16, where said drawing command is expressed by a page description language.

22. A color image processing method comprising the steps of:

inputting color image data of a color object;

determining a data type of said color image data and discriminating an image type of said color object; and performing a color matching process corresponding to the discriminated image type for said color object, to perform a color matching between different devices.

23. A color image processing method comprising the steps of:

inputting a drawing command having coordinate data and color data;

discriminating an image type of said drawing command; and performing a color matching process for said color data by using a color matching method, corresponding to the discriminated image type, between different devices, and a developing process, based on the coordinate data and color data, using the color matching method.

* * * * *

UNITED STATES PATENT AND TRADEMARK OFFICE
CERTIFICATE OF CORRECTION

PATENT NO. : 5,949,427

DATED : September 7, 1999

INVENTOR(S) : Naoyuki NISHIKAWA, et al.

Page 1 of 2

It is certified that error appears in the above-identified patent and that said Letters Patent is hereby corrected as shown below:

On the title page: Item

[54] TITLE
  Line 5, "IMPUT" should read --INPUT--.

COLUMN 1
  Line 5, "IMPUT" should read --INPUT--.

COLUMN 3
  Line 20, "correspond" should read --to correspond--.

COLUMN 4
  Line 16, "an" should read --a--.

COLUMN 7
  Line 33, "applicable" should read --apply--.

UNITED STATES PATENT AND TRADEMARK OFFICE
CERTIFICATE OF CORRECTION

PATENT NO. : 5,949,427

DATED : September 7, 1999

INVENTOR(S) : Naoyuki NISHIKAWA, et al.

It is certified that error appears in the above-identified patent and that said Letters Patent is hereby corrected as shown below:

COLUMN 8
Line 5, "laterdescribed" should read --later-described--.

COLUMN 11
Line 33, "select" should read --selected--.

Signed and Sealed this

Nineteenth Day of December, 2000

Attest:

Q. TODD DICKINSON

Attesting Officer

Commissioner of Patents and Trademarks